(12) United States Patent
Powell et al.

(10) Patent No.: US 9,958,585 B2
(45) Date of Patent: May 1, 2018

(54) COMPUTER VISION DEPTH SENSING AT VIDEO RATE USING DEPTH FROM DEFOCUS

(71) Applicant: Microsoft Technology Licensing, LLC, Redmond, WA (US)

(72) Inventors: Karlton Powell, Lake Steven, WA (US); Vivek Pradeep, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 14/827,859

(22) Filed: Aug. 17, 2015

(65) Prior Publication Data

US 2017/0053411 A1    Feb. 23, 2017

(51) Int. Cl.
| | | |
|---|---|---|
| *G02B 5/30* | (2006.01) | |
| *G01B 11/24* | (2006.01) | |
| *G01B 11/25* | (2006.01) | |
| *G06T 7/571* | (2017.01) | |
| *G02B 27/10* | (2006.01) | |

(Continued)

(52) U.S. Cl.
CPC ............ *G02B 5/3058* (2013.01); *G01B 11/24* (2013.01); *G01B 11/25* (2013.01); *G02B 27/106* (2013.01); *G06T 7/0051* (2013.01); *G06T 7/571* (2017.01); *H04N 5/2253* (2013.01); *H04N 5/2254* (2013.01); *H04N 5/23212* (2013.01)

(58) Field of Classification Search
CPC .............. G06T 7/0051; H04N 5/23212; H04N 5/2254; H04N 5/2253; G02B 5/3058; G02B 27/106
See application file for complete search history.

(56) References Cited

U.S. PATENT DOCUMENTS

| | | |
|---|---|---|
| 6,229,913 B1 | 5/2001 | Nayar et al. |
| 8,134,719 B2 | 3/2012 | Liang et al. |

(Continued)

OTHER PUBLICATIONS

SAPNA, "Imaging Congress—final summary", Published on: Jul. 15, 2013 Available at http://imaginlightly.blogspotin/2013/07/imaging-congress-final-summary.html.

(Continued)

*Primary Examiner* — Mekonnen Dagnew
(74) *Attorney, Agent, or Firm* — Lempia Summerfield Katz LLC

(57) ABSTRACT

Example embodiments simultaneously acquire multiple different focus state images for a scene at a video rate. The focus state images are acquired from a static arrangement of static optical elements. The focus state images are suitable for and sufficient for determining the depth of an object in the scene using depth from defocus (DFD) processing. The depth of the object in the scene is determined from the focus state images using DFD processing. The static optical elements may be off-the-shelf components that are used without modification. The static elements may include image sensors aligned to a common optical path, a beam splitter in the common optical path, and telecentric lenses that correct light in multiple optical paths produced by the beam splitter. The multiple optical paths may differ by a defocus delta. Simultaneous acquisition of the multiple focus state images facilitates mitigating motion blur associated with conventional DFD processing.

20 Claims, 17 Drawing Sheets

(51) Int. Cl.
  *G06T 7/00* (2017.01)
  *H04N 5/225* (2006.01)
  *H04N 5/232* (2006.01)

(56) References Cited

U.S. PATENT DOCUMENTS

| | | | |
|---|---|---|---|
| 8,432,434 | B2 | 4/2013 | Veeraraghavan et al. |
| 8,971,588 | B2 | 3/2015 | Abramovich et al. |
| 9,360,671 | B1* | 6/2016 | Zhou .................. G02B 27/017 |
| 2007/0189750 | A1 | 8/2007 | Wong et al. |
| 2011/0064282 | A1 | 3/2011 | Abramovich et al. |
| 2012/0076369 | A1* | 3/2012 | Abramovich ...... G06K 9/00033 |
| | | | 382/124 |
| 2012/0154668 | A1* | 6/2012 | Kimura .................. G01C 3/32 |
| | | | 348/348 |
| 2014/0132822 | A1 | 5/2014 | Miyagi et al. |
| 2014/0184748 | A1 | 7/2014 | Gharib et al. |
| 2015/0035824 | A1 | 2/2015 | Takahashi et al. |
| 2015/0237223 | A1* | 8/2015 | Fung .................. H04N 1/00204 |
| | | | 348/207.1 |
| 2015/0302573 | A1* | 10/2015 | Trouve ............... G02B 27/0075 |
| | | | 348/135 |

OTHER PUBLICATIONS

"The Pelican Depth-Sensing Array", Retrieved on: May 25, 2015 Available at: http://www.pelicanimaging.com/technology/.

Xian, et al., "Depth-from-Defocus: Blur Equalization Technique", In Proceedings of SPIE, vol. 6382, Oct. 12, 2006, 10 pages.

Moreno-Noguer, et al., "Avtive Refocusing of Images and Videos", In Proceedings of ACM SIGGRAPH, vol. 26, issue 3, Jul. 2007, 9 pages.

Watanabe, et al., "Telecentric Optics for Focus Analysis", In Proceedings of IEEE Transcations on Pattern Analysis and Machine Intelligence, vol. 19, Issue 12, Dec. 1997, pp. 1360-1365.

Brading, et al., "Using 3D Sensors to Bring Depth Discernment to Embedded Vision Apps", Published on Apr. 13, 2013 Available at http://www.embedded.com/design/real-world-applications/4411991/Using-3D-sensors-to-bring-depth-discernment-to-embedded-vision-apps.

Durand, et al., "Focus and Depth of Field". Published on May 17, 2008 Available at http://groups.csail.mit.edu/graphics/classes/CompPhoto06/html/lecturenotes/22_DepthDefocus_6.pdf.

Favaro, Paolo, "Depth from focus/defocus", Published on: Jun. 25, 2002 Available at http://homepages.inf.ed.ac.uk/rbf/CVonline/LOCAL_COPIES/FAVARO1/dfdtutorial.html.

"International Search Report and Written Opinion Issued in PCT Application No. PCT/US2016/042705", dated Nov. 4, 2016, 11 Pages.

Written Opinion of the International Preliminary Examining Authority in corresponding International Patent Application No. PCT/US2016/042705, dated Jul. 26, 2017, 7 pages.

"International Preliminary Report on Patentability Issued in PCT Application No. PCT/US2016/042705", dated Nov. 6, 2017, 8 Pages.

* cited by examiner

COMPUTER VISION DEPTH SENSING AT VIDEO RATE USING DEPTH FROM DEFOCUS

Pictures taken by a conventional camera report two-dimensional (2D) image coordinates of imaged objects in a scene, information about the actual three-dimensional (3D) location of the objects in the scene, particularly the distance from the camera, is lost as part of the imaging process. The distance from the camera may be referred to as the depth of the object from the camera and may be described using a Z co-ordinate notation. An image of a scene may have several objects located at different depths. In a dynamic scene, the objects may be changing position in all three dimensions.

Depth from defocus (DFD) is a technique that involves using a computer and camera to estimate the 3D surface of a scene from two or more images of the scene. For DFD to work, the two or more images may be acquired with different camera parameters (e.g., focal setting, image plane axial position) that facilitate determining depth.

The fundamental principle of DFD is that the amount of blur observed at a pixel in an acquired image is a function of optical properties of the lens and the distance of the object from the lens. If the optical properties are known, and if the amount of blur can be computed, scene depth can be estimated. Instead of directly measuring the amount of blur from a single image, DFD measures the change in blur between two or more images. Thus, DFD may include computationally measuring the change in the image quality/blur as function of varying camera settings and object distances. Measuring the change in image quality/blur is facilitated when the underlying image content has edges, textures, or patterns that produce varying pixel intensities. Active DFD involves projecting a structured light onto the scene to provide texture information over objects that have little texture (e.g., solid colored wall). Passive DFD involves receiving natural light that is present in the scene and that is rich in texture (e.g., CD labels, outdoor locations). The DFD mechanism to infer depth remains the same between active and passive approaches. An active DFD approach decreases the likelihood of DFD failing in places where there is little or no scene texture.

DFD uses a real aperture camera, as opposed to a pin-hole camera used in many computer vision techniques. Real aperture cameras may have a short depth of field that may produce images that appear to be focused on a small 3D portion of the scene. An example image formation process is described in, Depth from Focus/Defocus, Paolo Favaro, which presents the thin lens law.

$$1/u + 1/v = 1/f$$

where:
u=distance between the lens plane and plane in focus in the scene,
v=distance between the lens plane and image plane, and
f=focal length.

The conceptual problem for analyzing DFD can be stated as:
given a set of N≥2 images $I_1 \ldots I_N$, obtained with focal settings $u_1 \ldots u_N$ from the same scene, reconstruct the surface S of the scene. Reconstructing the surface of the scene depends, at least in part, on identifying the depth of objects in the scene.

When a scene is static, a computer vision system may take as long as necessary to acquire as many images as desired to analyze for identifying the depth of objects used in reconstructing a scene. But when a scene is not static, DFD may become more challenging because a finite number of images may be acquired in a small amount of time and those images may be compromised by object motion. For example, objects that are moving may appear blurry. Providing video rate DFD for non-static scenery continues to be a challenge.

DFD is not the only approach for depth sensing. For example, some conventional systems may perform depth sensing using time of flight (TOF) or depth from focus (OFF). TOF may provide acceptable resolution and motion artifact reduction but may require high-powered, high-frequency illumination. Multipath non-systemic noise issues also affect TOF systems. Conventional DFD provides depth sensing, but may have been dependent on characteristics of the lens used to capture images. The characteristics of the lens may also have impacted conventional DFD when traditional refocusing was performed by physically adjusting distances between various groups of elements in the lens or image sensing device.

Conventional DFD may use a sequence of images taken with different optical settings that are manually or mechanically switched between images. For example, a focus setting may be mechanically stepped through small increments by physically moving a portion of a lens assembly between successive images. For different pixels in a scene, the focus setting that maximizes image contrast may be determined and then used for image reconstruction for a corresponding scene point. Since the computing and mechanical/physical motion takes time, conventional DFD may produce suboptimal (e.g., blurry) results for non-static images, especially at high (e.g., 24 fps, 48 fps) frame rates associated with live video.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods concern a computer-vision system that determines depth in a scene using depth from defocus (DFD) at a frame rate and quality sufficient for video processing. An image acquisition portion of the computer vision system may be constructed from off-the-shelf (OTS) components and may have no moving parts. The computer vision system may simultaneously acquire two or more images of a scene using an arrangement of OTS components. The arrangement of OTS components may remain static while the two or more images are simultaneously acquired. Light from which the two or more simultaneously acquired images are produced may be telecentrically corrected using a member (e.g., lens) of the arrangement of OTS components. The two or more images may be acquired from two or more different telecentrically corrected paths that share at least a portion of a common optical imaging path. Simultaneously acquiring the two or more images facilitates mitigating motion blur, which in turn facilitates providing video rate DFD. Having no moving parts facilitates having sets (e.g., pairs) of images acquired more closely together in time since no time has to be allocated to allow the parts to move. Acquiring images temporally closer together also facilitates providing video rate DFD.

An example computer vision system may include a static arrangement of static optical elements (e.g., lens, beam splitter, image sensor) that simultaneously produce two or more different focus state images suitable for DFD video rate (e.g., 24 fps, 48 fps) processing. Example apparatus and methods simultaneously provide the two or more different focus state images without physically moving parts of the lens assembly or image sensor. The static arrangement may include two or more image sensors aligned to a common optical imaging path with a defocus delta set between different tele-centrically corrected paths. Optical paths of different optical lengths are used to produce the two or more focus state images. The static arrangement facilitates acquiring the different focus state images without requiring mechanical or physical movements of members of the static arrangement or static optical elements. In one embodiment, a patterned wire-grid polarizer may be placed and registered on top of an OTS sensor that is part of the static array of static optical elements.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods provide a computer-vision system that determines the depth of objects in a scene using depth from defocus (DFD) at a frame rate (e.g., 24 fps, 48 fps) and quality (e.g., sharpness, contrast, lack of motion blur) sufficient for video processing. An image acquisition portion of the computer vision system may be constructed from off-the-shelf (OTS) components and may have no parts that move while sets (e.g., pairs) of simultaneous images are acquired. Thus, the image acquisition portion of the computer vision system may be referred to as being a static arrangement of static optical elements since the elements remain static while the simultaneous images are acquired. An OTS component is a component that can be used as purchased without modification. For example, a lens, a beam splitter, and an image sensor that can be assembled into a static arrangement without being modified would be referred to as OTS components.

The computer vision system may simultaneously acquire two or more images of a scene using the static arrangement of OTS components. In one embodiment, the static arrangement of OTS components may include multiple image sensors while in another embodiment the static arrangement may only include a single image sensor. In one embodiment that includes two or more image sensors, light from which the two or more simultaneously acquired images are produced may be telecentrically corrected using a member (e.g., telecentric lens) of the static-arrangement of OTS components. The two or more images may be acquired from two or more different telecentrically corrected paths that share at least a portion of a common optical imaging path. Simultaneously acquiring the two or more images facilitates mitigating motion blur, which in turn facilitates providing video rate DFD.

Figure 1:
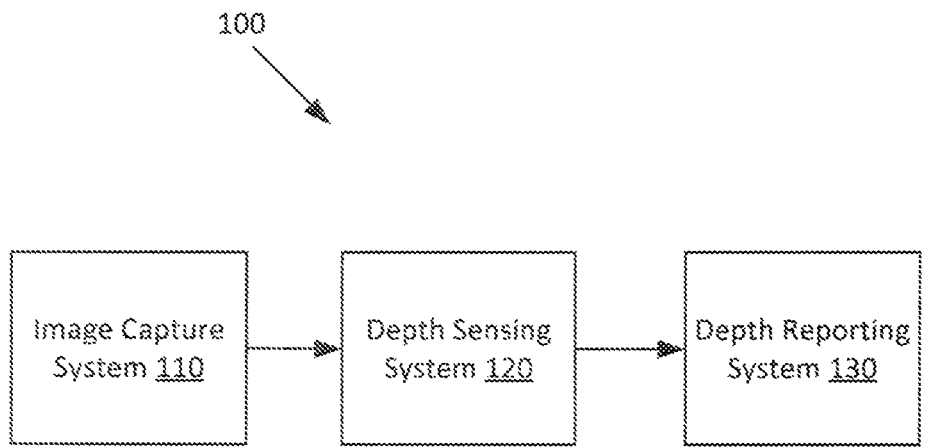
FIG. 1 illustrates an example apparatus that performs computer vision depth sensing at video rate using DFD.

FIG. 1 illustrates an example apparatus 100 for performing computer vision depth sensing at a video rate (e.g., 24 fps, 48 fps) and quality using DFD. Apparatus 100 includes an image capture system 110, a depth sensing system 120, and a depth reporting system 130. Image capture system 110 includes an arrangement of optical elements that remain in a static configuration while simultaneously producing two different focus state images for a scene. The two different focus state images are sufficient for determining the depth of an object in the scene using DFD processing. Depth sensing system 120 determines the depth of the object in the scene from the two different focus state images using DFD processing. Depth reporting system 130 provides the distance to the object.

In one embodiment, the optical elements in the image capture system 110 may be OTS components that are used without modification. The OTS components may include, for example, an imaging lens, a beam splitter, a telecentric lens, and an image sensor. The optical elements may be used to capture a single pair of different focus state images or may be used to capture a series of pairs of different focus state images. The series of pairs of different focus state images may be associated with, for example, a video. The series of pairs of different focus state images may be captured at different frame rates. Recall that an issue with conventional systems that perform DFD processing is that different focus state images may not be acquired simultaneously and thus may exhibit motion blur. The images may not be acquired simultaneously because producing the different focus state images may require mechanical movement of a portion of an optical element. For example, a mechanical adjustment of a portion of an optical element that affects its focus may be required. These mechanical adjustments take time and thus may cause the different focus state images to be acquired at times separated by the amount of time needed to make the mechanical adjustment. Separating the acquisition of the different focus state images by this mechanical adjustment time may produce different focus state images that are not suited for high frame rates associated with video processing.

Figure 2:
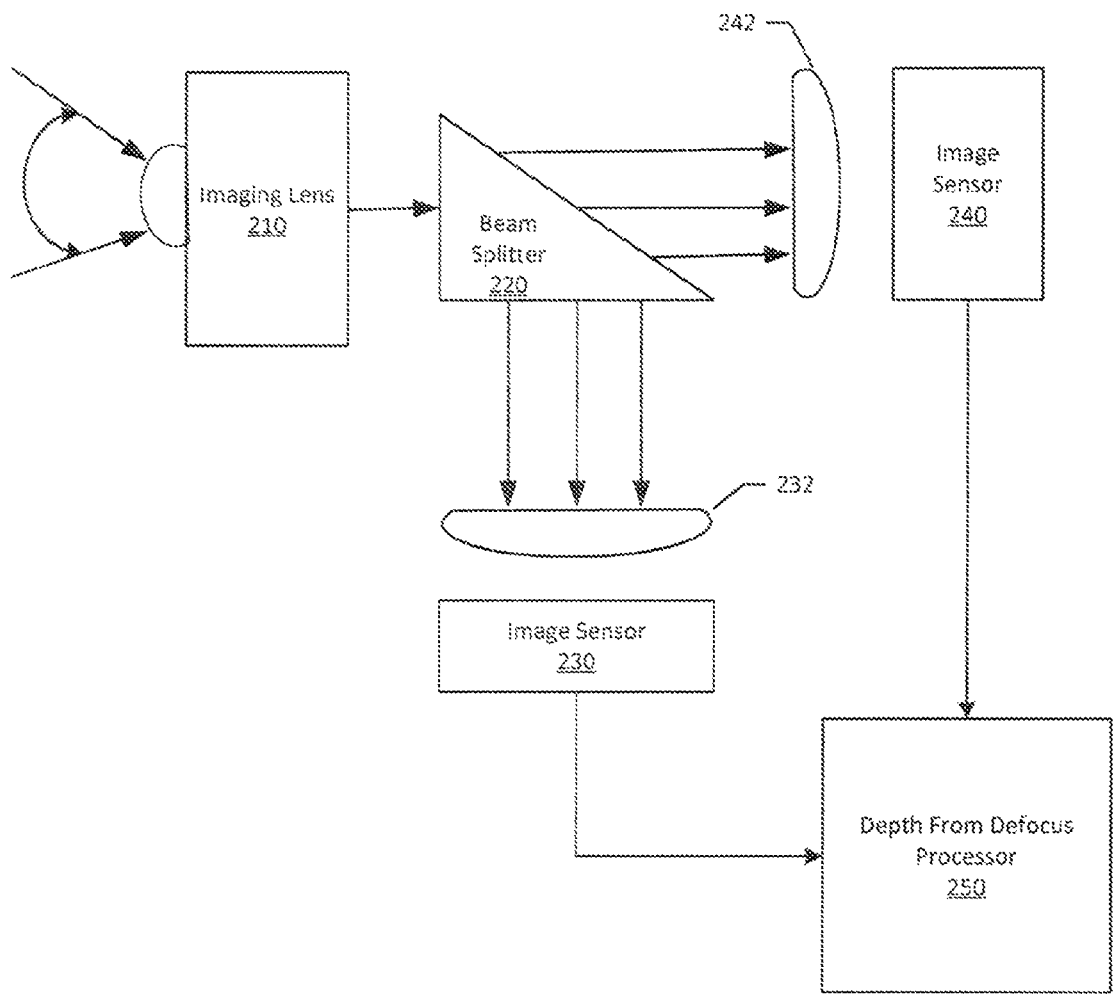
FIG. 2 illustrates an example static arrangement of static off-the-shelf optical elements that simultaneously acquire two different focus state images suitable for DFD processing

FIG. 2 provides additional detail about one possible configuration of optical elements that resolve issues associated with mechanical adjustments made between acquisitions of different focus state images. The arrangement illustrated in FIG. 2 has no moving parts and thus may simultaneously acquire the different focus state images thereby improving on conventional systems.

Light may enter an image capture system through an imaging lens 210. The light may then pass through a beam splitter 220 that passes light along two different optical paths. In one path, light may pass through a telecentric lens 232 that corrects the light before it arrives at image sensor 230. In another path, light may pass through a telecentric tens 242 before it arrives at an image sensor 240. The telecentric lenses 232 and 242 facilitate reducing or eliminating magnification changes between defocus states by doing telecentric correction at the image sensor plane.

In this embodiment the arrangement of optical elements includes a first image sensor 230 that produces a first image having a first focus state and a second image sensor 240 that produces a second image having a second focus state. The first image sensor 240 may have a first focus plane (e.g., far) and the second image sensor 250 may have a second focus plane (e.g., near). Note that the first image sensor 230 and the second image sensor 240 are both aligned to a common optical imaging path that includes beam splitter 220. Having two separate optical paths produced from the common optical path facilitates simultaneously producing the two focus state images. In one embodiment, the first optical imaging path and the second optical imaging path differ by a defocus delta.

Figure 5:
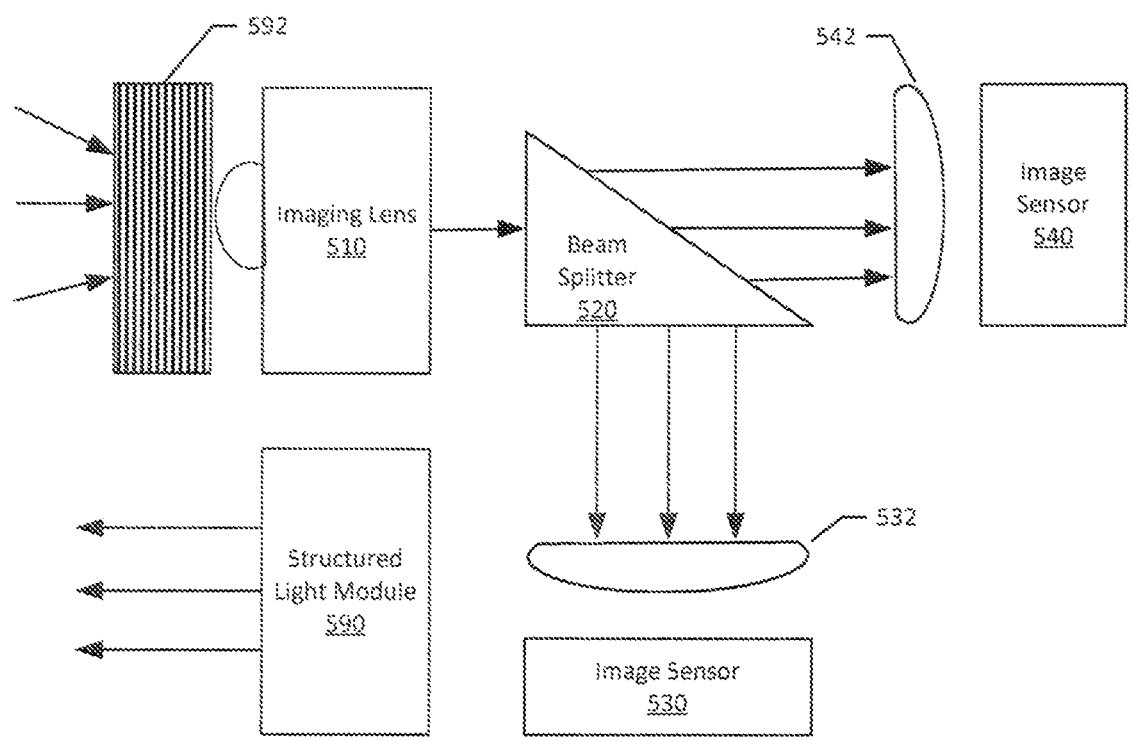
FIG. 5 illustrates an example static arrangement of static optical elements including a structured light module and a bandpass filter.

In one embodiment, which may be referred to as a passive system, the first image sensor 230 produces the first image using visible light available from the scene and the second image sensor 240 produces the second image using visible light available from the scene. FIG. 5 illustrates another embodiment that may be referred to as an active system because it produces the images based, at least in part, on light that is added to the scene.

In one embodiment, the image capture system simultaneously produces the two different focus state images at a rate of at least 24 frames per second (fps). In another embodiment, the image capture system simultaneously produces the two different focus state images at a rate of at least 48 fps. 24 fps and 48 fps are two common video rates in computer vision. While 24 fps and 48 fps are described, other frame rates may be employed. Capturing the two different focus state images simultaneously facilitates supporting these video quality frame rates while mitigating motion blur.

In one embodiment, an image capture system and depth sensing system may be incorporated into a game console. In another embodiment, an image capture system and depth sensing system may be incorporated into a smartphone. In one embodiment, an image capture system may reside in a first device (e.g., game console, smart phone) and a depth sensing system may reside in a second device (e.g., computer). In one embodiment, the second device may be located in the cloud. In this configuration, the image capture system may capture a series of sets (e.g., pairs) of different focus state images at a desired frame rate and provide the images to the depth sensing system. The depth sensing system may include, for example, a depth from defocus processor 250. In one embodiment, the arrangement of optical elements may be located in the same apparatus as DFD processor 250. In another embodiment, the arrangement of optical elements may be located in a different apparatus than DFD processor 250. DFD processor 250 receives the first image from image sensor 230 and the second image from image sensor 240. The DFD processor 250 then performs depth sensing using DFD on the first image and the second image.

Figure 3:
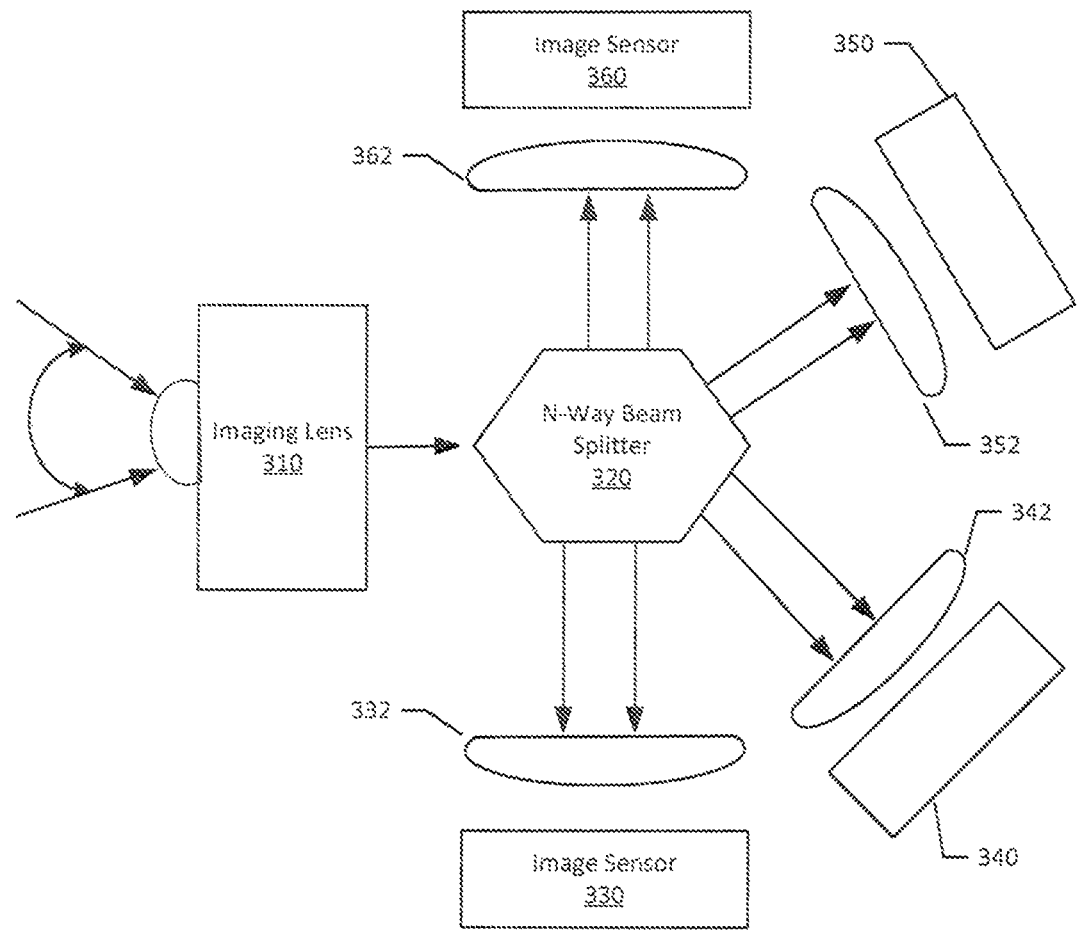
FIG. 3 illustrates an example static arrangement of static off-the-shelf optical elements that simultaneously acquire four different focus state images suitable for DFD processing.

FIG. 3 illustrates an arrangement of optical elements associated with a more general example that is not limited to producing just two different focus state images. The more general example may also include an image capture system comprising an arrangement of optical elements that while fixed in a single position simultaneously produce N different focus state images for a scene at a video rate (e.g., 24 fps), N being an integer greater than 1. In this more general example, the N different focus state images are sufficient for determining the depth of objects in the scene using DFD. This more general example may also include a depth sensing system that determines the distances to the objects using two or more of the N different focus state images using DFD processing. In one embodiment, the optical elements are OTS components that are used without modification in the arrangement of optical elements.

In this more general example, the image capture system includes N different image sensors that produce the N different focus state images. The N different image sensors are all aligned to a common optical imaging path that includes a beam splitter(s) that produces N different optical imaging paths corresponding to the N different image sensors. Members of the N different optical imaging paths transmit light to the N different image sensors. The N different optical imaging paths differ by defocus deltas that may be known to the depth sensing system. The N different optical imaging paths may include telecentric lenses that correct light transmitted along a selected optical imaging path after the light passes through the beam splitter(s) and before the light reaches an image sensor in the selected optical imaging path.

In one embodiment, the arrangement of optical elements includes an imaging lens 310 through which light from the scene is captured. The light may pass through the imaging lens 310 and arrive at an N-way beam splitter 320. While a single N-way beam splitter 320 is illustrated, in different embodiments, one or more beam splitters may be present. Four different optical paths are illustrated. A first path includes a telecentric lens 332 that corrects light before it arrives at image sensor 330. A second path includes a telecentric lens 342 that corrects light before it arrives at an image sensor 340. A third path includes a telecentric lens 352 that corrects light before it arrives at an image sensor 350. A fourth path includes a telecentric lens 362 that corrects light before it arrives at an image sensor 380. While four optical paths are illustrated, a greater or lesser number of optical paths may be employed. While each optical path is illustrated having a telecentric lens, in some embodiments, not all optical paths may have a telecentric lens.

In general, a beam splitter may be used to achieve two simultaneous image focus states. Additionally, an x-cube having two orthogonal beam splitting layers providing a degree (e.g., 50%) of beam splitting may be used to split input light from an object space into three optical paths corresponding to the three output legs of the x-cube. Having three optical paths facilitates simultaneous capture of three states. While a beam splitter is illustrated, in different embodiments, a grating, diffractive optic element (DOE), or holographic optic element (HOE) may facilitate imaging two or more image focus states by splitting input light from an object space into laterally offset image regions. The grating, DOE, or HOE embodiment does not require a standard optical beam splitter. In the grating based splitting embodiments, the two or more image focus states may be acquired with a single image sensor.

One example N-way splitter may employ an imaging lens with a long back focal length configured so that various levels of partial reflectors split off a portion of light in series, such as using a common imaging lens and several split-off equal path lengths. In different examples, a cube beam-splitter or plate beam-splitter may be employed in a two sensor system. In one example four sensor system, three beam splitters having progressively increasing reflection-to-transmission ratio (e.g., R:T of (1) 25%:75%, (2) 33.3%:66.7% and (3) 50%:50%) may be employed. In one embodiment, legs could be tapped off in series. In another embodiment, legs could split into multiple legs and be tapped by splitting, as long as the optical path length is long enough to support achieving focus and level of defocus desired by different sensors.

Figure 4:
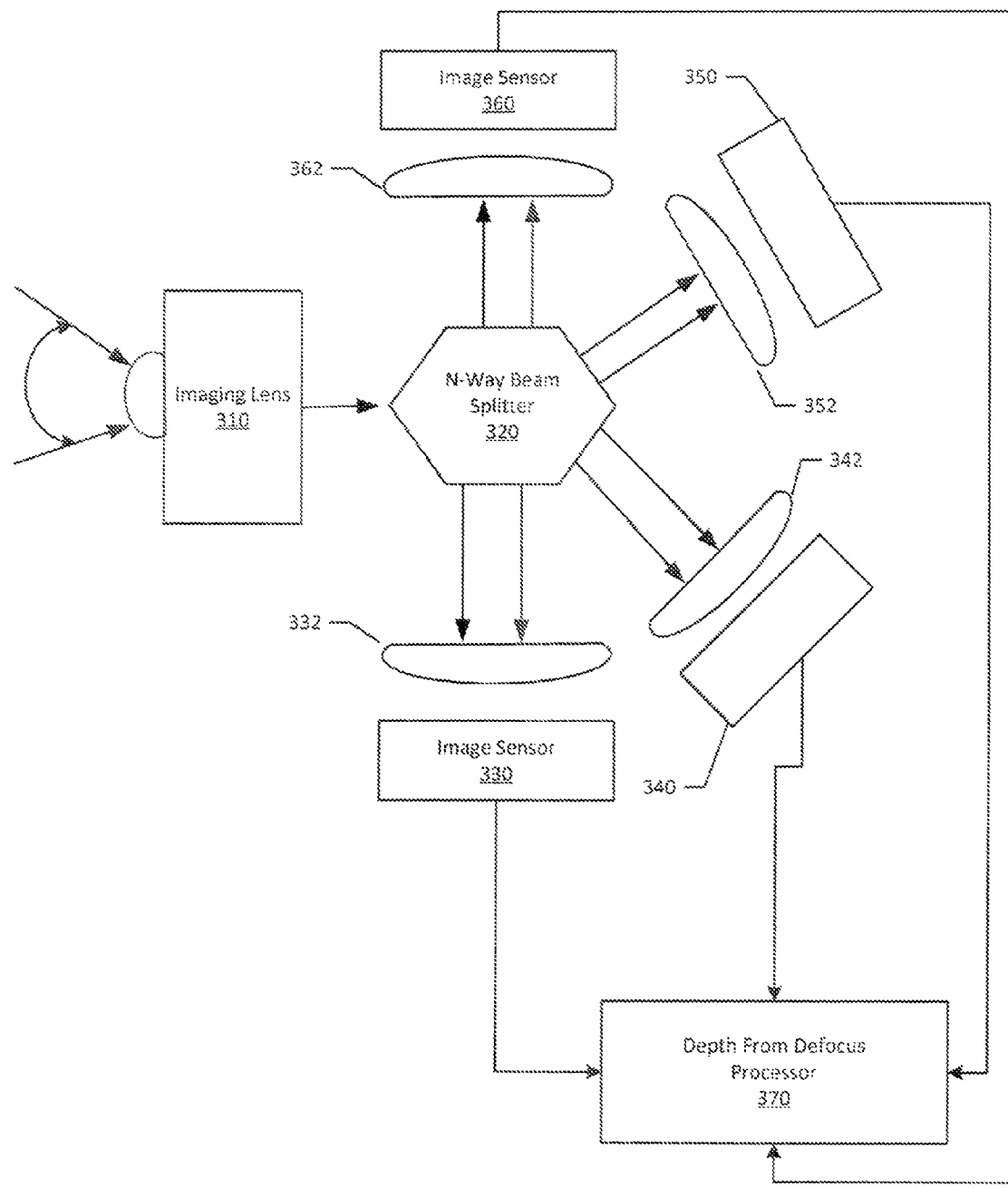
FIG. 4 illustrates an example static arrangement of static off-the-shelf optical elements that simultaneously acquire four different focus state images suitable for DFD processing.

FIG. 4 illustrates the arrangement of optical components from FIG. 3 and a DFD processor 370. DFD processor 370 may receive the different focus state images and determine the depth of objects in the scene to facilitate reconstructing the scene for video quality computer vision. In one embodiment, all the optical components may be static during the acquisition of a set of different focus state images. In this static configuration, all N of the different focus state images may be acquired simultaneously. In one embodiment, the beam splitter may be, for example, a mirror or other device that is rotating or oscillating at a high rate. In this embodiment, different members of the N different focus state images may not be acquired simultaneously but may still be acquired closer together in time than is possible when a mechanical adjustment to focal length is required.

FIG. 5 illustrates an arrangement of optical elements for simultaneously acquiring multiple different focus state images. The arrangement includes an imaging lens 510 through which light is presented to a beam splitter 520. Beam splitter 520 sends light along two different optical paths. A first path includes a telecentric lens 532 that corrects light before it arrives at image sensor 530. A second path includes a telecentric lens 542 that corrects light before it arrives at image sensor 540. This arrangement also includes a structured light module 590 that sends structured light into the scene. In one embodiment, the structured light module 590 includes a laser that produces the structured light. The structured light may have a speckle pattern or a dot pattern. Some of this structured light may return and pass through imaging lens 510.

This embodiment also includes a band pass filter 592 that limits light provided to the common optical path through imaging lens 510. In one embodiment, the light may be limited to be within a range of wavelengths in the structured light sent into the scene by the structured light module 590. Different embodiments may or may not include the band pass filter 592.

In this embodiment, the first image sensor 530 may produce the first image based, at least in part, on structured light captured from the scene. Similarly, the second image sensor 540 may produce the second image based, at least in part, on structured light captured from the scene.

While FIGS. 2-5 illustrate multiple image sensors, in one embodiment, an image capture system may include just a single image sensor. To facilitate simultaneously acquiring multiple images with different focus states, the image capture system may include a patterned wire-grid polarizer. In one embodiment, a patterned wire-grid polarizer may be made from an array of very fine (e.g., subwavelength in pitch) lithographed wires on a substrate. In one embodiment, the polarizer may be orthogonally polarized. In one embodiment, the pattern on the patterned wire-grid polarizer may include regions having interstitially spaced horizontally polarized cells and vertically polarized cells. Other patterns may be employed. In this embodiment, the image capture system still simultaneously acquires different images with different focus image states. The different embodiments illustrated in FIGS. 2-5 may all operate without the necessity of a calibration board.

Recall that some conventional image sensors include micro-lenses over each pixel for improving light collection efficiency. In one embodiment that employs a patterned wire-grid polarizer, the polarizer may be disposed on a substrate such that the patterned side of substrate is facing the micro-lens layer and is aligned and registered above the layer of micro-lenses of an OTS sensor. In another embodiment, the polarizer may be embedded or buried between the layer of micro-lenses and the detecting pixels layer.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, distributions, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 6:
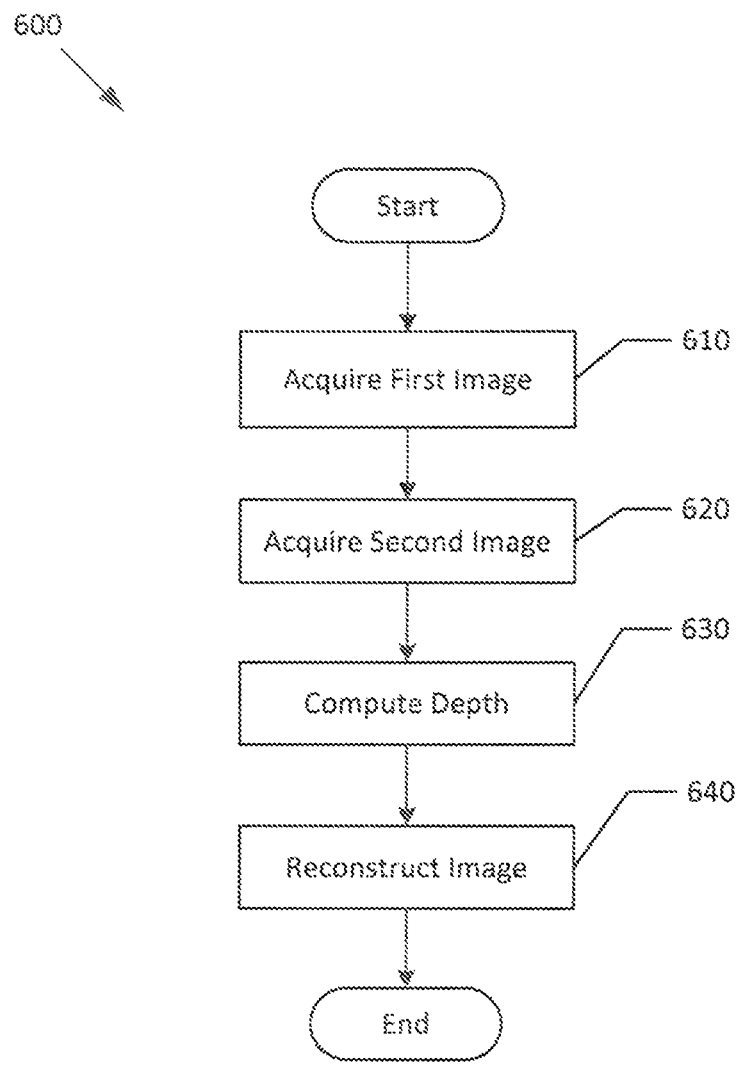
FIG. 6 illustrates an example method associated with performing real-time video-rate computer vision using a static arrangement of static optical elements that feed a DFD processor.

FIG. 6 illustrates a computerized method 600 associated with reconstructing a scene acquired using computer vision at a rate of at least 24 frames per second. Method 600 includes, at 610, acquiring a first computer vision image from a depth sensing apparatus that has an arrangement of optical components. The first computer vision image has a first focus image state.

Method 600 also includes, at 620, acquiring a second computer vision image from the depth sensing apparatus. The second computer vision image has a second different focus image state. The first and second computer vision images are acquired simultaneously. The first and second computer vision images may have a known defocus delta between the images, meaning the first focus image state or image plane and the second focus image state or image plane may be known to a DFD processor. Acquiring the images simultaneously facilitates mitigating motion blur, which in turn facilitates supporting higher frame rates. In one embodiment, to facilitate mitigating motion blur, the arrangement of optical components remains static during the acquisition of the first computer vision image and the second computer vision image.

Method 600 also includes, at 630, computing the depth of one or more objects in the scene using DFD processing. The first computer vision image and the second computer vision image are provided as inputs to the DFD processing. In one embodiment, actions 810 and 620 may be performed on a first device and action 630 may be performed on a separate device. In another embodiment actions 610, 620, and 630 may all be performed on the same device.

Method 600 also includes, at 640, reconstructing the scene based, at least in part, on the depth of the one or more objects. In one embodiment, computing the depth of an object in the scene includes determining whether the object is more in focus in the first computer vision image or in the second computer vision image.

Figure 7:
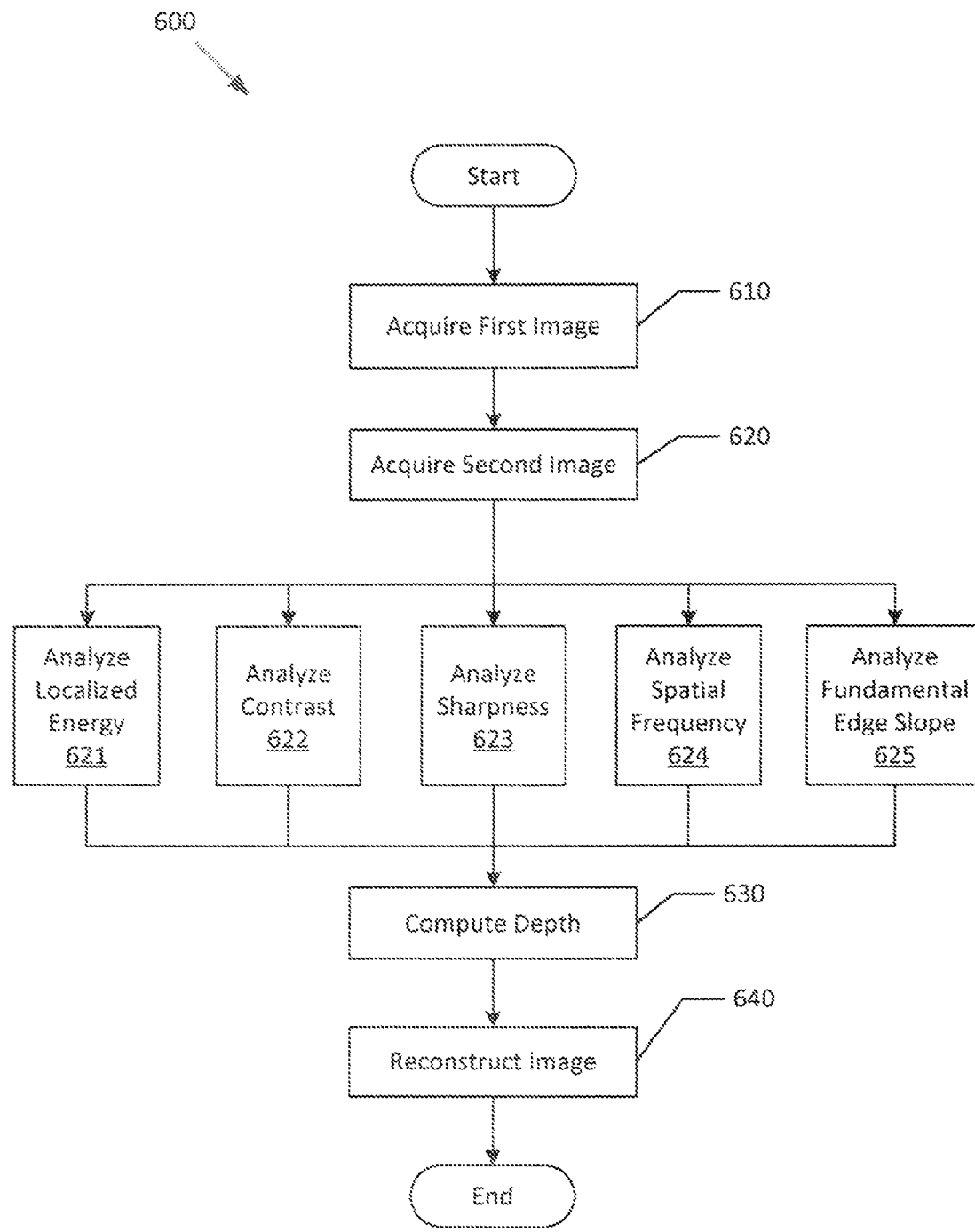
FIG. 7 illustrates an example method associated with performing real-time video-rate computer vision using a static arrangement of static optical elements that feed a DFD processor.

FIG. 7 illustrates another embodiment of method 600. This embodiment provides more detail concerning the ways in which depth may be determined. For example, determining depth may depend on determining whether the object is more in focus in the first computer vision image or the second computer vision image. Determining in which image the object is more in focus may in turn be based on several different approaches. One approach may include, at 621, analyzing a level of localized energy in a portion of the first computer vision image and a corresponding portion of the second computer vision image. One approach may include, at 622, analyzing a contrast in the portion of the first computer vision image or the corresponding portion of the second computer vision image. One approach may include, at 623, analyzing sharpness in the portion of the first computer vision image or the corresponding portion of the second computer vision image. One approach may include, at 624, analyzing spatial frequency content in the portion of the first computer vision image or the corresponding portion of the second computer vision image. One approach may include, at 625, analyzing a fundamental edge slope between the first computer vision image and the second computer vision image.

While FIGS. 6 and 7 illustrate various actions occurring in serial, it is to be appreciated that various actions illustrated in FIGS. 6 and 7 could occur substantially in parallel. By way of illustration, a first process could acquire or access images, a second process could determine depth, and a third process could reconstruct an image. While three processes are described, it is to be appreciated that a greater or lesser number of processes could be employed and that lightweight processes, regular processes, threads, and other approaches could be employed.

In one example, a method may be implemented as computer-executable instructions. Thus, in one example, a computer-readable storage device may store computer executable instructions that if executed by a machine (e.g., computer) cause the machine to perform methods described or claimed herein including method 800. While executable instructions associated with the above methods are described as being stored on a computer-readable storage device, it is to be appreciated that executable instructions associated with other example methods described or claimed herein may also be stored on a computer-readable storage device. In different embodiments, the example methods described herein may be triggered in different ways. In one embodiment, a method may be triggered manually by a user. In another example, a method may be triggered automatically.

Figure 8:
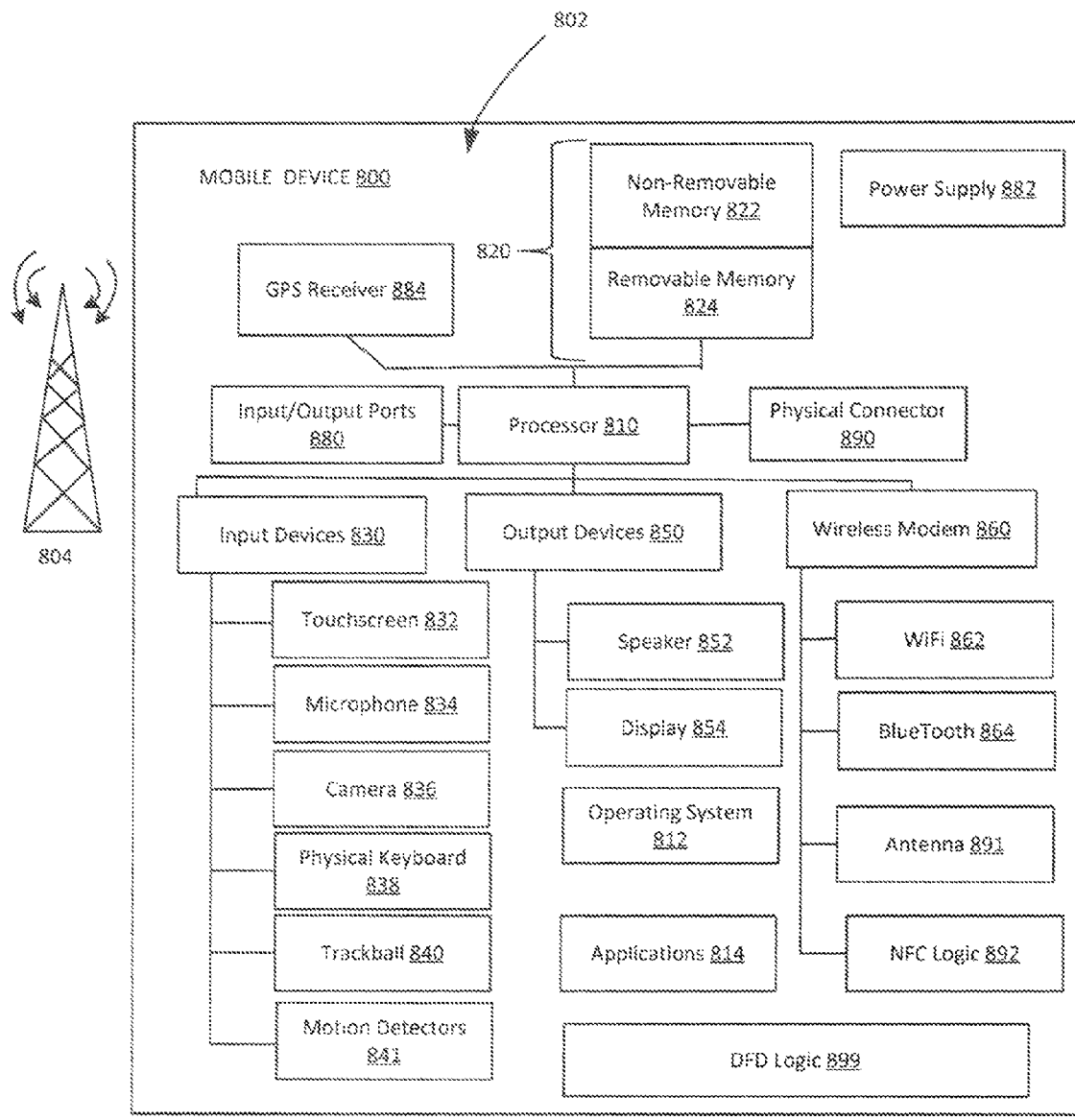
FIG. 8 is a system diagram depicting an exemplary mobile communication device that may include a computer vision system that performs DFD processing on simultaneously acquired images.

FIG. 8 is a system diagram depicting an exemplary mobile device 800 that includes a variety of optional hardware and software components, shown generally at 802. In one embodiment, the functionality associated with the hardware components may be performed, at least in part, by hardware logic components including, but not limited to, FPGAs, ASICs, application specific standard products (ASSPs), SOCs, or complex programmable logic devices (CPLDs). Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, game console) and may allow wireless two-way communications with mobile communications networks 804 (e.g., cellular network, satellite network).

Mobile device 800 may include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include defocus delta settings, computer vision images, depth data, or other data. The memory 820 can be used to store a subscriber identifier, such as an International Mobile Subscriber identity (IMSI), and an equipment identifier, such as an International Mobile Equipment Identifier (IMEI). The identifiers can be transmitted to a network server to identify users or equipment.

The mobile device 800 can support input devices 830 including, but not limited to, a touchscreen 832, a microphone 834, a camera 838, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures. The input devices 830 may also include motion sensing input devices (e.g., motion detectors 841).

A wireless modem 880 can be coupled to an antenna 881. In some examples, radio frequency (RF) filters are used and the processor 810 need not select an antenna configuration for a selected frequency band. The wireless modem 880 can support two-way communications between the processor 810 and external devices. The modem 860 is shown generically and can include a cellular modem for communicating with the mobile communication network 804 and/or other radio-based modems (e.g., Bluetooth 884 or Wi-Fi 882). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC logic 892 facilitates having near field communications (NFC).

The mobile device 800 may include at least one input/output port 880, a power supply 882, a satellite navigation system receiver 884, such as a Global Positioning System (GPS) receiver, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a DFD logic 899 that is configured to provide a functionality for the mobile device 800. For example, DFD logic 899 may provide depth sensing from images provided by a static arrangement of static optical elements that simultaneously produce a series of two or more different focus state images at a video frame rate. Portions of the example methods described herein may be performed by DFD logic 899. Similarly, DFD logic 899 may implement portions of apparatus described herein.

Figure 9:
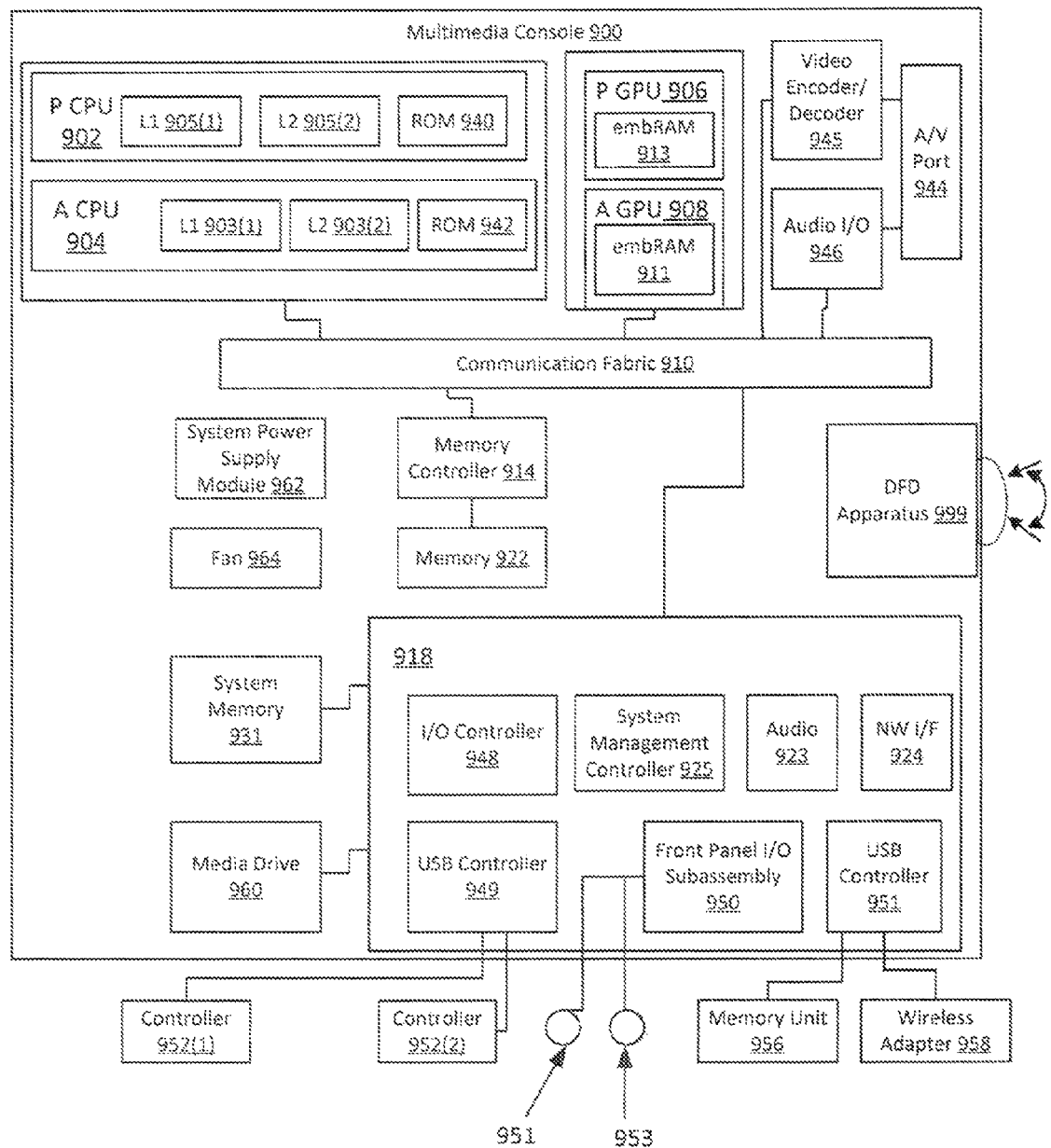
FIG. 9 illustrates an example game console that may include a computer vision system that performs DFD processing on simultaneously acquired images.

FIG. 9 illustrates an example embodiment of a multimedia computer system architecture with scalable platform services. A multimedia console 900 has a platform CPU 902 and an application CPU 904. For ease of connections in the drawings, the CPUs are illustrated in the same module, however, they may be separate units and share no cache or ROM. Platform CPU 902 may be a single core processor or a multicore processor. In this example, the platform CPU 902 has a level 1 cache 905(1) and a level 2 cache 905(2) and a flash ROM 904.

The multimedia console 900 further includes the application CPU 904 for performing multimedia application functions. CPU 904 may also include one or more processing cores, in this example, the application CPU 904 has a level 1 cache 903(1) and a level 2 cache 903(2) and a flash ROM 942.

The multimedia console 900 further includes a platform graphics processing unit (GPU) 908 and an application graphics processing unit (GPU) 908. For ease of connections in the drawings, the CPUs are illustrated in the same module, however they may be separate units and share no memory structures. Each GPU may have its own embedded RAM 911, 913.

The CPUs 902, 904, GPUs 908, 908, memory controller 914, and various other components within the multimedia console 900 are interconnected via one or more buses, including serial and parallel buses, a memory bus, a peripheral bus, and a processor or local bus a bus architecture. By way of example, the bus architectures can include a Peripheral Component Interconnects (PCI) bus, PCI-Express bus, etc for connection to an IO chip and/or as a connector for future IO expansion. Communication fabric 910 is representative of the various busses or communication links that also have excess capacity.

In this embodiment, each GPU and a video encoder/decoder (codec) 945 may form a video processing pipeline for high speed and high resolution graphics processing. Data from the embedded RAM 911, 913 or GPU 906, 908 is stored in memory 922. Video codec 945 accesses the data in memory 922 via the communication fabric 910. The video processing pipeline outputs data to an A/V (audio/video) port 944 for transmission to a television or other display.

Lightweight messages (e.g., pop ups) generated by an application are created by using the GPU to schedule code to render the popup into an overlay video plane. The amount of memory used for an overlay plane depends on the overlay area size, which preferably scales with screen resolution. Where a full user interface is used by the concurrent platform services application, it is preferable to use a resolution independent of application resolution. A scaler may be used to set this resolution so that the need to change frequency and cause a TV resync is eliminated. A memory controller 914 facilitates processor access to various types of memory 922, including, but not limited to, one or more DRAM (Dynamic Random Access Memory) channels.

The multimedia console 900 includes an I/O controller 948, a system management controller 925, an audio processing unit 923, a network interface controller 924, a first USB host controller 949, a second USB controller 951, and a front panel I/O subassembly 950 that are preferably implemented on a module 918. The USB controllers 949 and 951 serve as hosts for peripheral controllers 952(1)-952(2), a wireless adapter 958, and an external memory device 958

(e.g., flash memory, external CD/DVD ROM drive, memory stick, removable media, etc.). The network interface 924 and/or wireless adapter 958 provide access to a network (e.g., the internet, home network, etc.) and may be various wired or wireless adapter components including an Ethernet device, a modem, a Bluetooth module, or a cable modem.

System memory 931 is provided to store application data that is loaded during the boot process. The application data may be, for example, computer vision images, depth information, defocus delta information, state data, dynamic data, or other data. A media drive 980 is provided and may be a DVD/CD drive, Blu-Ray drive, hard disk drive, or other removable media drive, etc. The media drive 960 may be internal or external to the multimedia console 900. Application data may be accessed via the media drive 960 for execution, playback, or other actions by the multimedia console 900. The media drive 960 is connected to the I/O controller 948 via a bus, such as a Serial ATA bus or other high speed connection (e.g., IEEE 1394).

The system management controller 925 provides a variety of service functions related to assuring availability of the multimedia console 900. The audio processing unit 923 and an audio codec 948 form a corresponding audio processing pipeline with high fidelity and stereo processing. Audio data is stored in memory 922 and accessed by the audio processing unit 923 and the audio input/output unit 948 that form a corresponding audio processing pipeline with high fidelity stereo and multichannel audio processing. When a concurrent platform services application wants audio, audio processing may be scheduled asynchronously to the gaming application due to time sensitivity. The audio processing pipeline outputs data to the A/V port 944 for reproduction by an external audio user or device having audio capabilities.

The front panel I/O subassembly 950 supports the functionality of the power button 951 and the eject button 953, as well as any LEDs (light emitting diodes) or other indicators exposed on the outer surface of the multimedia console 900. A system power supply module 982 provides power to the components of the multimedia console 900. A fan 964 cools the circuitry within the multimedia console 900.

The multimedia console 900 may be operated as a standalone system by simply connecting the system to a television or other display. In this standalone mode, the multimedia console 900 allows one or more users to interact with the system, watch movies, listen to music, or engage in other activities. However, with the integration of broadband connectivity made available through the network interface 924 or the wireless adapter 958, the multimedia console 900 may further be operated as a participant in a larger network community.

After multimedia console 900 boots and system resources are reserved, concurrent platform services applications execute to provide platform functionalities. The platform functionalities are encapsulated in a set of platform applications that execute within the reserved system resources described above. The operating system kernel identifies threads that are platform services application threads versus gaming application threads.

Optional input devices (e.g., controllers 952(1) and 952(2)) are shared by gaming applications, system applications, and other applications (e.g., gamified adaptive digital disc jockey). The input devices may be switched between platform applications and the gaming application so that each can have a focus of the device. The I/O controller 948 may control the switching of input stream, and a driver may maintain state information regarding focus switches.

Figure 10:
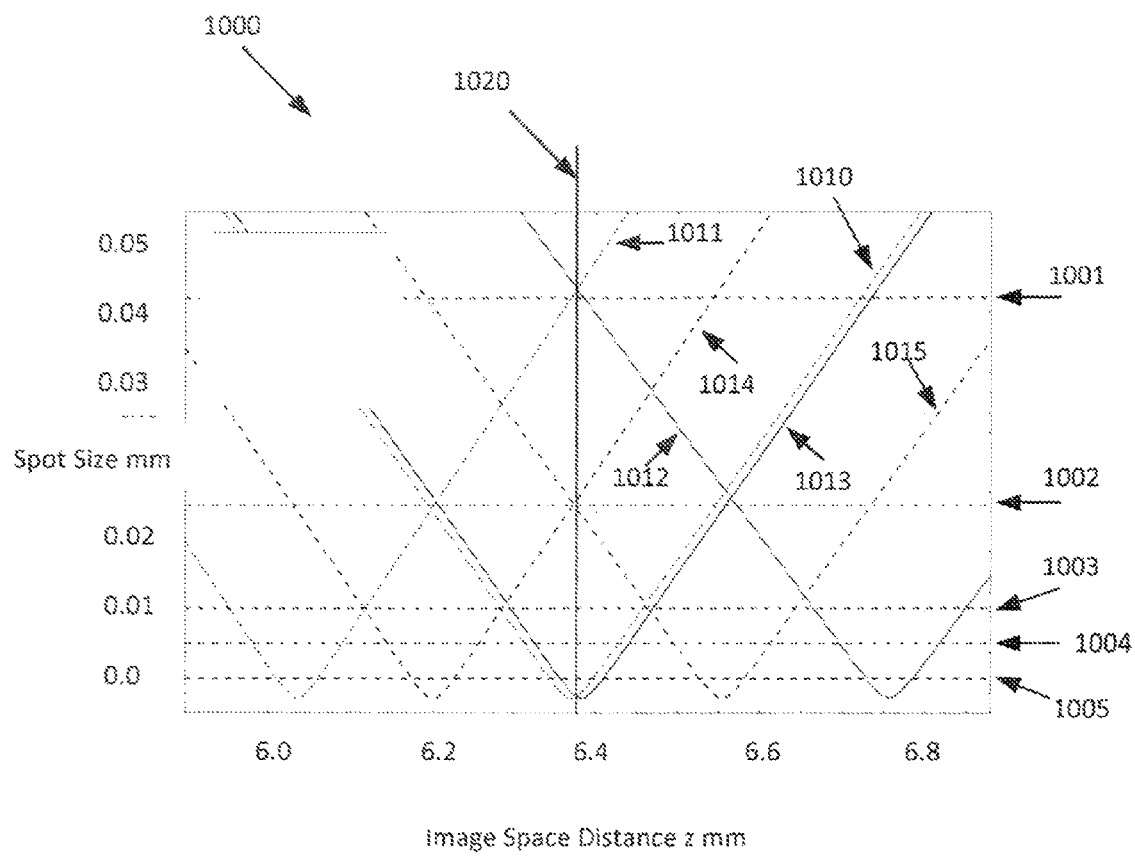
FIG. 10 illustrates a plot of a mapping of an object space to z defocus near the image focus plane.

FIG. 10 illustrates a plot 1000 of an example mapping of an object space to z defocus. The x axis represents the image space distance in millimeters and the y axis represents resolvable spot size in millimeters. The mapping illustrates one approach for determining an ideal amount of defocus for a range of interest. Recall that an arrangement of optical elements may produce images with different focus states. One focus state may be associated with a far object distance and another focus state may be associated with a near object distance. FIG. 10 illustrates that if an image sensor plane or a relayed plane is placed at an image distance z so that the path through the high index is in focus for far object distance and the path through the low index is in focus for the near object distance, then objects at the extremes may have similar focus/defocus levels. Line 1001 represents a spot size of twelve pixels, line 1002 represents a spot size of six pixels, line 1003 represents a spot size of three pixels, line 1004 represents a spot size of two pixels, and line 1005 represents a spot size of one pixel. Plot 1010 represents the resolvable spotsize along z in image space within proximity of image focus of an object placed at a far distance of $z_0$=1000 mm when imaged through high refractive index. Plot 1011 represents the resolvable spotsize along z in image space within proximity of image focus of an object placed at a far distance of $z_0$=1000 mm when imaged through low refractive index. Plot 1012 represents spotsize along image space z for a near object distance of $z_0$=100 mm through high n. Plot 1013 represents spotsize along image space z for a near object distance of $z_0$=100 mm through low n. Plot 1014 represents spotsize along image space z for an intermediate object distance of $z_0$=185 mm through low n. Plot 1015 represents spotsize along image space z for an intermediate object distance of $z_0$=185 mm through high n. Note that for a target design range of interest from near to far, the best focus of near objects through low refractive index may be made to coincide with best focus of far objects through high refractive index. In this way, the complementary defocused extremes of the range may be defocused by a substantially similar amount of blur. In this case, the blur of far objects through low refractive index may be substantially similar to the blur of near objects through high refractive index. An image space z plane having this type of relationship for this example is plane 1020.

Figure 11:
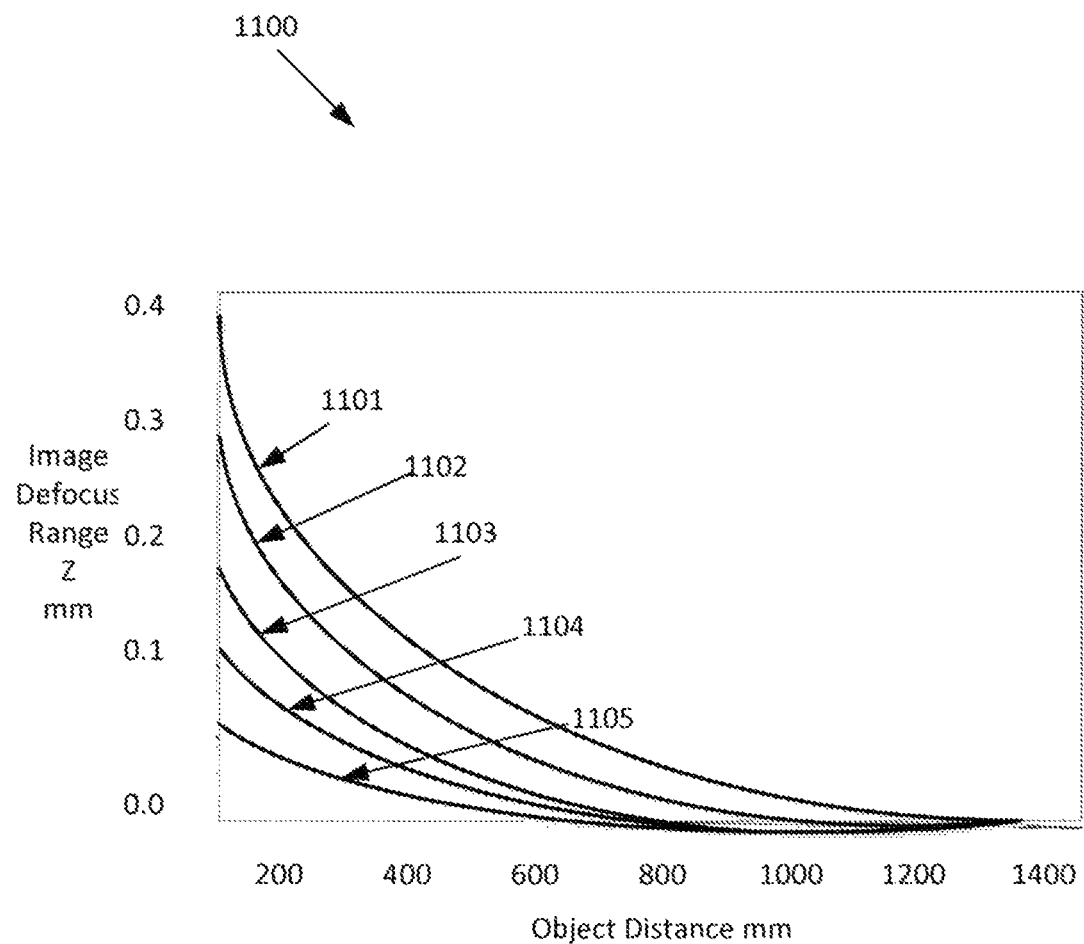
FIG. 11 illustrates the dependence of defocus range on system attributes including focal length of the main imaging lens.

FIG. 11 illustrates a plot 1100 that shows how a defocus range Δz is dependent on the difference in conjugate distances corresponding to a working range (near object distance, far object distance) for a system and the imaging lens focus length f. The x axis represents object distance in millimeters and the y axis represent image defocus range z in millimeters. Curve 1101 is associated with a focal length of 7 mm, curve 1102 is associated with a focal length of 8 mm, curve 1103 is associated with a focal length of 5 mm, curve 1104 is associated with a focal length of 4 mm, and curve 1105 is associated with a focal length of 3 mm.

Figure 12:
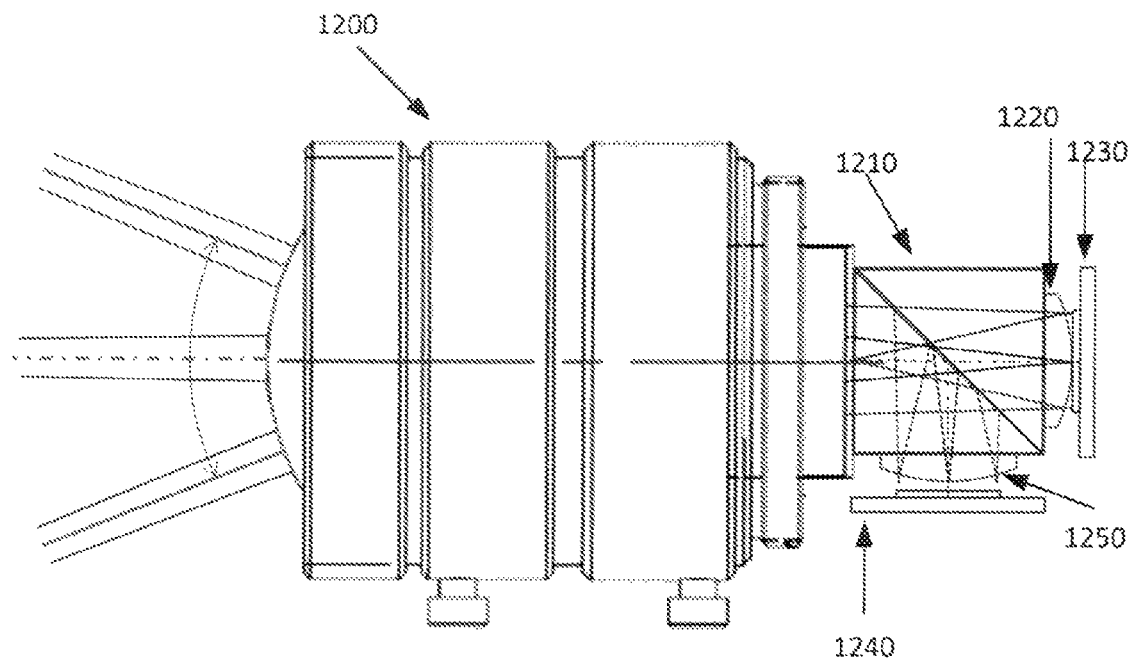
FIG. 12 illustrates another example arrangement of elements that support computer vision depth sensing at video rate using DFD.

FIG. 12 illustrates another example arrangement of elements that support computer vision depth sensing at video rate using DFD. The arrangement includes an imaging lens 1200, a beamsplitter 1210, a first image sensor 1230, a first telecentric correcting lens 1220, a second image sensor 1240, and a second telecentric correcting lens 1250. The first image sensor 1230 may accept an image having a first focus plane (e.g., far) while the second image sensor 1240 may accept an image having a second focus plane (e.g., near).

Figure 13:
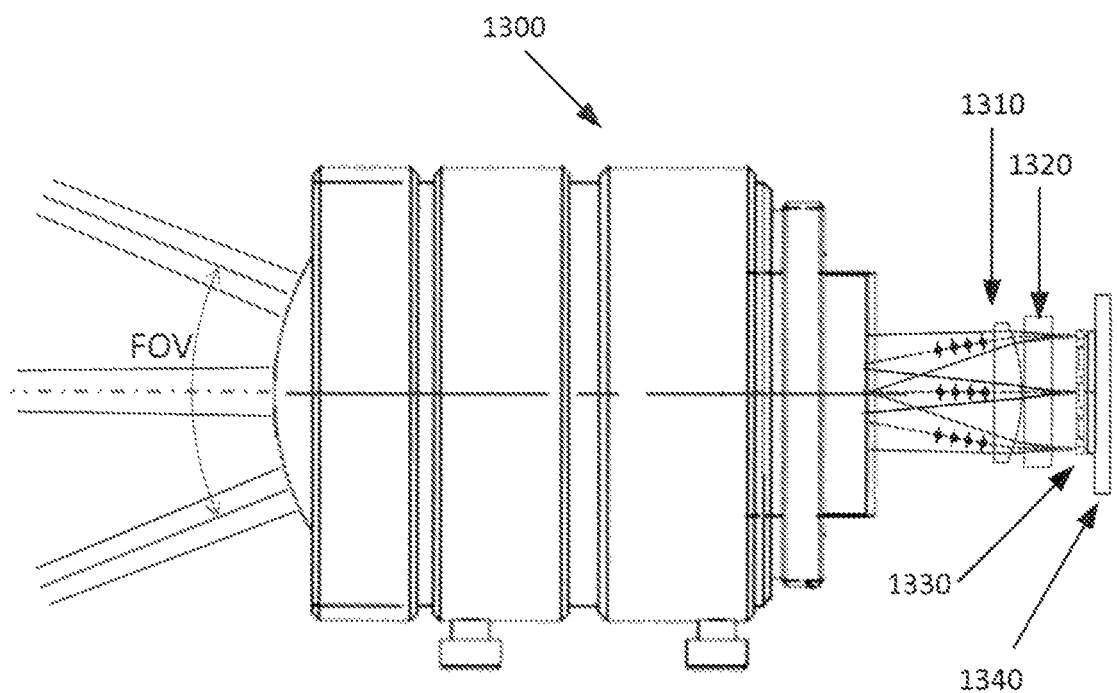
FIG. 13 illustrates another example arrangement of elements that support computer vision depth sensing at video rate using DFD.
Figure 14:
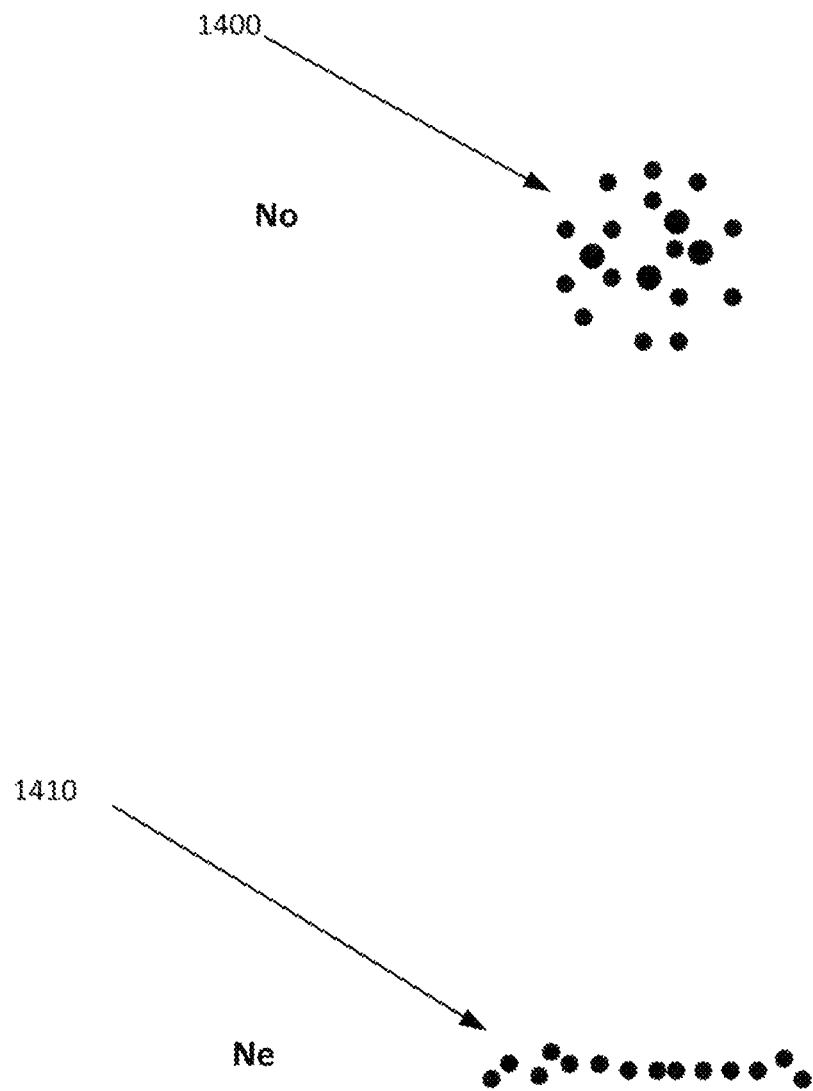
FIG. 14 illustrates a non-circularly symmetric resolvable spot.
Figure 15:
FIG. 15 illustrates a non-circularly symmetric resolvable spot.
Figure 16:
FIG. 16 illustrates a non-circularly symmetric resolvable spot.

FIG. 13 illustrates another example arrangement of elements that support computer vision depth sensing at video rate using DFD. The arrangement includes an imaging lens 1300, an image sensor 1340, a birefringent plate 1320, a patterned wire-grid polarizer 1330, and a telecentric lens 1310. The combination of elements facilitates simultaneous capture of different focus states. The birefringent plate 1320 splits the image in a spatially patterned way. In one embodiment, two focus states produced by the birefringent plate 1320 may be offset by as little as a single row and column of pixels. When using a birefringent plate 1320, the resolvable spot footprints of the defocus states due to near and far object distances may not be circularly symmetric. FIGS. 14, 15, and 16 illustrate this phenomenon. While circular symmetry may not be present, the change in defocus is linear and consistent with the axes of the birefringent plate 1320. The telecentric correction performed by the lens 1310 facilitates minimizing variation of an elliptical spot resolve footprint versus a position on the image sensor 1340. Thus, telecentric correction facilitates maintaining a consistent effect in an axis versus pixel position across the image sensor 1340. In one embodiment, DFD processing may be applied individually or in parallel to the x and y orientations produced by the birefringent plate. In one embodiment, orientation of the polarization state of the cells of the patterned wire-grid polarizer are aligned with the fast and slow axes of the birefringent plate to improve the purity of and contrast between focus states produced by the birefringent plate. In one embodiment, the choice of alignment depends on which axis is the high axis and which axis is the low axis with respect to the ordinary and extraordinary index.

FIG. 14 illustrates two spots 1400 and 1410 that were acquired from an example apparatus when object distance z=1500 mm. Spot 1400 was acquired from an image with a first focus state while spot 1410 was acquired from an image having a second focus state.

FIG. 15 illustrates two spots 1500 and 1510 that were acquired from an example apparatus when object distance z=285 mm. Spot 1500 was acquired from an image with a first focus state while spot 1510 was acquired from an image having a second focus state.

FIG. 16 illustrates two spots 1600 and 1810 that were acquired from an example apparatus when object distance z=130 mm. Spot 1800 was acquired from an image with a first focus state while spot 1810 was acquired from an image having a second focus state.

Figure 17:
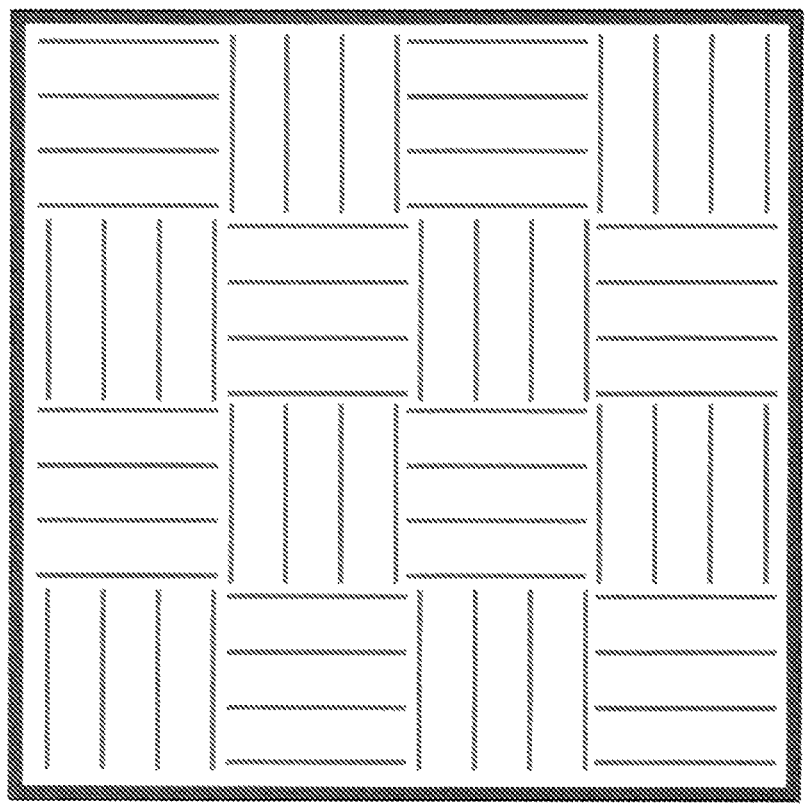
FIG. 17 illustrates an example patterned wire-grid polarizer.

FIG. 17 illustrates an example patterned wire-grid polarizer 1700. In one embodiment, the patterned wire-grid polarizer 1700 may have orthogonal R/T polarization states in a checkerboard pattern over pixel cells. One set of pixels may see one polarization state while another set of pixels may see another polarization state. In one embodiment, the patterned wire-grid polarizer 1700 may be aligned and registered with a grid array of pixels on an image sensor. In another embodiment, the patterned wire-grid polarizer 1700 may be optically relayed to a grid array of pixels on an image sensor.

Aspects of Certain Embodiments

Example implementations described herein include, but are not limited to, combinations of the following examples.

An apparatus as described above alone or in combination with any of the above or below examples, where the apparatus includes an image capture system, a depth sensing system, and a depth reporting system.

An apparatus where the image capture system includes an arrangement of optical elements that remain in a static configuration while simultaneously producing two different focus state images for a scene. The two different focus state images are suitable for and sufficient for determining the depth of an object in the scene using DFD processing.

An apparatus where the depth sensing system determines the depth of the object in the scene from the two different focus state images using DFD processing.

An apparatus where the depth reporting system provides the distance to the object.

An apparatus where the optical elements are OTS components that are used without modification.

An apparatus where the arrangement of optical elements includes a first image sensor that produces a first image having a first focus state and a second image sensor that produces a second image having a second focus state, where the first image sensor and the second image sensor are both aligned to a common optical imaging path.

An apparatus where the arrangement of optical elements includes a beam splitter in the common optical imaging path, where the beam splitter sends light from the scene along a first optical imaging path in which the first image sensor is positioned and sends light from the scene along a second optical imaging path in which the second image sensor is positioned.

An apparatus where the first optical imaging path and the second optical imaging path differ by a defocus delta.

An apparatus where the first optical imaging path includes a first telecentric lens that corrects light transmitted along the first optical imaging path after the light passes through the beam splitter and before the light reaches the first image sensor and where the second optical imaging path includes a second telecentric lens that corrects light transmitted along the second optical imaging path after the light passes through the beam splitter and before the light reaches the second image sensor.

An apparatus where the first image sensor produces the first image using visible light available from the scene and the second image sensor produces the second image using visible light available from the scene.

An apparatus where there is a structured light module that sends structured light into the scene, where the first image sensor produces the first image based, at least in part, on structured light captured from the scene and the second image sensor produces the second image based, at least in part, on structured light captured from the scene.

An apparatus where the structured light module includes a laser that produces the structured light and where the structured light has a speckle pattern or a dot pattern.

An apparatus where the image capture system simultaneously produces the two different focus state images at a rate of at least 24 fps or at least 48 fps.

An apparatus that includes a band pass filter that limits light provided to the common optical path to be within a range of wavelengths in the structured light sent into the scene by the structured light module.

An apparatus where the image capture system includes a single image sensor configured with a patterned wire-grid polarizer.

An apparatus where the pattern on the patterned wire-grid polarizer includes regions having interstitially spaced horizontally polarized cells and vertically polarized cells.

An apparatus where the image capture system is incorporated info a game console or a smartphone, and where the depth sensing system is incorporated into the game console or the smartphone.

A computerized method for reconstructing a scene acquired using computer vision at a rate of at least 24 fps.

A computerized method that includes acquiring a first computer vision image from a depth sensing apparatus that has an arrangement of optical components, where the first computer vision image has a first focus image state, and that includes simultaneously acquiring a second computer vision image from the depth sensing apparatus, where the second computer vision image has a second focus image state, where the arrangement of optical components remains static during the acquisition of the first computer vision image and the second computer vision image.

A computerized method that includes computing the depth of one or more objects in the scene using DFD processing on the first computer vision image and the second computer vision image.

A computerized method that includes reconstructing the scene based, at least in part, on the depth of the one or more objects.

A computerized method where computing the depth of an object in the scene includes determining whether the object is more in focus in the first computer vision image or the second computer vision image.

A computerized method where determining whether the object is more in focus in the first computer vision image or the second computer vision image is based, at least in part, on a level of localized energy in a portion of the first computer vision image and a corresponding portion of the second computer vision image, a contrast in the portion of the first computer vision image or the corresponding portion of the second computer vision image, a sharpness in the portion of the first computer vision image or the corresponding portion of the second computer vision image, a spatial frequency content in the portion of the first computer vision image or the corresponding portion of the second computer vision image, or a fundamental edge slope between the first computer vision image and the second computer vision image.

An apparatus comprising an image capture system and a depth sensing system.

An apparatus where the image capture system includes an arrangement of optical elements that while fixed in a single position simultaneously produce N different focus state images for a scene at a rate of at least 24 fps, N being an integer greater than 1 where the N different focus state images are sufficient for determining the depth of objects in the scene using DFD processing.

An apparatus where the depth sensing system determines the distances to the objects using two or more of the N different focus state images using DFD processing.

An apparatus where the optical elements are OTS components that are used without modification in the arrangement of optical elements.

An apparatus where the image capture system includes N different image sensors that produce the N different focus state images, where the N different image sensors are all aligned to a common optical imaging path that includes one or more beam splitters that produce N different optical imaging paths corresponding to the N different image sensors, where members of the N different optical imaging paths transmit light to the N different image sensors, where the N different optical imaging paths differ by defocus deltas, and where one or more of the N different optical imaging paths include a telecentric lens that corrects light transmitted along a selected optical imaging path after the light passes through the one or more beam splitters and before the light reaches an image sensor in the selected optical imaging path.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data, "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage devices may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware or firmware, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above Rather, the specific features and acts described above are disclosed as example forms of implementing the claims.

What is claimed is:

1. An apparatus, comprising:
an image capture system comprising an arrangement of static optical elements that remain in a static configuration while simultaneously producing two different focus state images for a scene, where the two different focus state images are sufficient for determining the depth of an object in the scene using depth from defocus processing;
a depth sensing system that determines the depth of the object in the scene from the two different focus state images using depth from defocus processing, and
a depth reporting system that provides the distance to the object;
wherein the arrangement of static optical elements comprises a telecentric lens configured to implement telecentric correction for at least one of the two different focus state images.

2. The apparatus of claim 1, where the optical elements are off-the-shelf components that are used without modification.

3. The apparatus of claim 1, where the arrangement of optical elements includes a first image sensor that produces a first image having a first focus state and a second image sensor that produces a second image having a second focus state, where the first image sensor and the second image sensor are both aligned to a common optical imaging path.

4. The apparatus of claim 3, where the arrangement of optical elements includes a beam splitter in the common optical imaging path, where the beam splitter sends light from the scene along a first optical imaging path in which the first image sensor is positioned and sends light from the scene along a second optical imaging path in which the second image sensor is positioned, where the first optical imaging path and the second optical imaging path differ by a defocus delta.

5. The apparatus of claim 4, where the beam splitter is a beam splitting plate, a series of beam splitting plates, a pellicle splitter, a beam splitting cube, an x-cube, a diffractive optic element, a diffraction grating, or a holographic optic element.

6. The apparatus of claim 5, where the first optical imaging path includes a first telecentric lens that corrects light transmitted along the first optical imaging path after the light passes through the beam splitter and before the light reaches the first image sensor and where the second optical imaging path includes a second telecentric lens that corrects light transmitted along the second optical imaging path after the light passes through the beam splitter and before the light reaches the second image sensor, wherein the first telecentric lens or the second telecentric lens corresponds with the telecentric lens configured to implement the telecentric correction.

7. The apparatus of claim 1, where the first image sensor produces the first image using visible light available from the scene and the second image sensor produces the second image using visible light available from the scene.

8. The apparatus of claim 1, comprising:
a structured light module that sends structured light into the scene, where the two different focus state images are produced from structured light captured from the scene.

9. The apparatus of claim 8, where the structured light module includes a laser that produces the structured light and where the structured light has a speckle pattern or a dot pattern.

10. The apparatus of claim 9, comprising:
a band pass filter that limits light provided to the common optical path to be within a range of wavelengths in the structured light sent into the scene by the structured light module.

11. The apparatus of claim 1, where the image capture system simultaneously produces the two different focus state images at a rate of at least 24 frames per second.

12. The apparatus of claim 1, where the image capture system simultaneously produces the two different focus state images at a rate of at least 48 frames per second.

13. The apparatus of claim 1, where the image capture system includes a single image sensor, a birefringent plate that produces the two different focus state images by splitting light presented to the image capture system in a spatially patterned way, and a patterned wire-grid polarizer that polarizes light after passing through the birefringent plate and before reaching the single image sensor, wherein the telecentric lens focuses light presented to the image capture system before the light reaches the birefringent plate to reduce non-circular symmetry in a spot on the single image sensor.

14. The apparatus of claim 13, where the pattern on the patterned wire-grid polarizer includes orthogonally polarized regions.

15. The apparatus of claim 1, where the image capture system is incorporated into a game console or a smartphone, and where the depth sensing system is incorporated into the game console or the smartphone.

16. A computerized method for reconstructing a scene acquired using computer vision at a rate of at least twenty four frames per second, comprising:
acquiring a first computer vision image from a depth sensing apparatus that has an arrangement of optical components, where the first computer vision image has a first focus image state;
simultaneously acquiring a second computer vision image from the depth sensing apparatus, where the second computer vision image has a second focus image state, where the arrangement of optical components remains static during the acquisition of the first computer vision image and the second computer vision image, wherein the arrangement of optical components comprises a telecentric lens configured to implement telecentric correction for the first focus image state or the second focus image state;
computing the depth of one or more objects in the scene using depth from defocus processing on the first computer vision image and the second computer vision image; and
reconstructing the scene based, at least in part, on the depth of the one or more objects.

17. The computerized method of claim 16, where computing the depth of an object in the scene includes determining whether the object is more in focus in the first computer vision image or the second computer vision image.

18. The computerized method of claim 17, where determining whether the object is more in focus in the first computer vision image or the second computer vision image is based, at least in part, on a level of localized energy in a portion of the first computer vision image and a corresponding portion of the second computer vision image, a contrast in the portion of the first computer vision image or the corresponding portion of the second computer vision image, a sharpness in the portion of the first computer vision image or the corresponding portion of the second computer vision image, a spatial frequency content in the portion of the first computer vision image or the corresponding portion of the second computer vision image, or a fundamental edge slope between the first computer vision image and the second computer vision image.

19. An apparatus, comprising:

an image capture system comprising an arrangement of optical elements that while fixed in a single position simultaneously produce N different focus state images for a scene at a rate of at least twenty four frames per second, N being an integer greater than 1, where the N different focus state images are sufficient for determining the depth of objects in the scene using depth from defocus processing; and a depth sensing system that determines the distances to the objects using two or more of the N different focus state images using depth from defocus processing, where the optical elements are off-the-shelf components that are used without modification in the arrangement of optical elements;

wherein the arrangement of optical elements comprises a telecentric lens configured to implement telecentric correction for at least one of the N different focus state images.

20. The apparatus of claim 19, where the image capture system includes N different image sensors that produce the N different focus state images, where the N different image sensors are all aligned to a common optical imaging path that includes one or more beam splitters that produce N different optical imaging paths corresponding to the N different image sensors, where members of the N different optical imaging paths transmit light to the N different image sensors, where the N different optical imaging paths differ by defocus deltas, and where one of the N different optical imaging paths includes the telecentric lens, wherein the telecentric lens corrects light transmitted along a selected optical imaging path after the light passes through the one or more beam splitters and before the light reaches an image sensor in the selected optical imaging path.

* * * * *